(12) United States Patent
Fujishiro

(10) Patent No.: US 7,602,449 B2
(45) Date of Patent: Oct. 13, 2009

(54) PROJECTION TYPE LIQUID CRYSTAL DISPLAY UNIT WITH REFLECTED INCIDENT LIGHT

(75) Inventor: Fumihiko Fujishiro, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 25 days.

(21) Appl. No.: 11/082,934

(22) Filed: Mar. 18, 2005

(65) Prior Publication Data

US 2005/0162574 A1  Jul. 28, 2005

Related U.S. Application Data

(62) Division of application No. 10/640,329, filed on Aug. 14, 2003, now Pat. No. 6,924,851.

(51) Int. Cl.
*G02F 1/1335* (2006.01)

(52) U.S. Cl. .............................. 349/9; 349/58

(58) Field of Classification Search ................. 349/5–9, 349/58
See application file for complete search history.

(56) References Cited

U.S. PATENT DOCUMENTS

| | | | |
|---|---|---|---|
| 4,235,527 A | | 11/1980 | Greubel et al. |
| 4,950,072 A | | 8/1990 | Honda |
| 5,251,049 A | * | 10/1993 | Sato et al. ..................... 349/43 |
| 5,847,795 A | | 12/1998 | Satoh et al. |
| 5,978,054 A | | 11/1999 | Fujimori |
| 6,022,110 A | | 2/2000 | Tsujikawa |
| 6,130,728 A | | 10/2000 | Tsujikawa et al. |
| 6,292,239 B1 | * | 9/2001 | Nagamura et al. ............ 349/58 |
| 6,320,628 B1 | | 11/2001 | Tsujikawa et al. |
| 6,396,634 B1 | | 5/2002 | Ishikawa et al. |
| 6,426,787 B1 | | 7/2002 | Satake et al. |
| 6,476,880 B2 | | 11/2002 | Tsujikawa et al. |
| 6,530,665 B2 | * | 3/2003 | Takizawa et al. ............ 353/119 |
| 6,747,713 B1 | * | 6/2004 | Sato ............................. 349/58 |

FOREIGN PATENT DOCUMENTS

| | | |
|---|---|---|
| JP | 53-13349 | 2/1978 |
| JP | A10-170935 | 6/1978 |
| JP | A 60-254537 | 12/1985 |
| JP | 4-104244 | 4/1992 |
| JP | A 5-40261 | 11/1992 |
| JP | A 5-40261 | 2/1993 |
| JP | 7-64070 | 3/1995 |
| JP | 8-76081 | 3/1996 |
| JP | A 9-107570 | 4/1997 |
| JP | A 9-171359 | 6/1997 |

(Continued)

*Primary Examiner*—David Nelms
*Assistant Examiner*—David Y Chung
(74) *Attorney, Agent, or Firm*—Young & Thompson

(57) ABSTRACT

A projection type liquid crystal display unit includes (a) a first frame (13) having a first surface (15) formed with a first opening (13*a*), (b) a second frame (12) having a second surface formed with a second opening (12*a*), and (c) a liquid crystal display panel (11) sandwiched between the first and second frames (13, 12) such that an incident light passes through the second opening (12*a*), the liquid crystal display panel (11) and the first opening (13*a*) in this order. The first and second frames (13, 12) are both composed of resin, and the first surface (15) of the first frame (13) is roughened.

6 Claims, 10 Drawing Sheets

FOREIGN PATENT DOCUMENTS

| | | |
|---|---|---|
| JP | 10062775 A | 3/1998 |
| JP | 10186544 A | 7/1998 |
| JP | A 11-24074 | 1/1999 |
| JP | 11038407 A | 2/1999 |
| JP | 11-149071 | 6/1999 |

* cited by examiner

PROJECTION TYPE LIQUID CRYSTAL DISPLAY UNIT WITH REFLECTED INCIDENT LIGHT

CROSS REFERENCE TO RELATED APPLICATIONS

This application is a division of co-pending application Ser. No. 10/640,329, filed on Aug. 14, 2003; which is a Division of Ser. No. 09/773,907 filed on Feb. 2, 2001, the entire contents of which are hereby incorporated by reference.

BACKGROUND OF THE INVENTION

1. Field of the Invention

The invention relates to a projection type liquid crystal display unit, and more particularly to an improvement in a frame supporting a liquid crystal light bulb therewith for prevention reflection of a light therefrom.

2. Description of the Related Art

Recently, various projection type liquid crystal display units such as a liquid crystal projector have been developed. A projection type liquid crystal display unit is grouped into a light-transmission type and a light-reflection type, and further grouped into a single plate type and a three-plates type in dependence on the number of liquid crystal light bulbs to be used therein.

Hereinbelow is explained a light-transmission and single plate type liquid crystal display unit with reference to FIG. 2.

The illustrated liquid crystal display unit is comprised of a light source 1, a converging lens 2, a first polarizing plate 3a, a liquid crystal light bulb 4, a second polarizing plate 3b, a projection lens 5, and a screen 6.

In operation, a natural light emitted from the light source 1 passes through the converging lens 2, and is converted into a linearly polarized light by the first polarizing plate 3a. The thus converted linearly polarized light enters the liquid crystal light bulb 4, and is modulated in the liquid crystal light bulb 4 as variation in polarization in accordance with an image signal. The light leaving the liquid crystal light bulb 4 passes through the second polarizing plate 3b, and is projected onto the screen in an increased size by the projection lens 5.

Hereinbelow is explained a light-transmission and three-plate type liquid crystal display unit with reference to FIG. 6.

The illustrated liquid crystal display unit is comprised of a light source 1, an optical system 21 for converting a light into a polarized light, two dichroic mirrors 22, four all-reflection mirrors 23, converging lenses 24, first polarizing plates 25a, second polarizing plates 25b, light liquid crystal bulbs 26, a dichroic prism 27, a projection lens 28, and a screen 29.

In operation, natural lights emitted from the light source 1 are converted into linearly polarized lights having the same forwarding direction and polarizing direction, by the optical system 21. The thus converted linearly polarized lights are separated into blue, green and red lights by an optical separation system comprised of the two dichroic mirrors 22 and the all-reflection mirrors 23. The blue, green and red lights pass through the associated converging lenses 24 and first polarizing plates 25a, and then, illuminate the associated liquid crystal light bulbs 26.

The linearly polarized lights entering the liquid crystal light bulbs 26 are modulated in the liquid crystal light bulbs 26 as variation in polarization in accordance with an image signal. The lights leaving the liquid crystal light bulbs 26 enter the associated second polarizing plates 25b. A portion of the lights displaying black is absorbed into the second polarizing plates 25b, whereas a portion of the lights displaying white passes through the second polarizing plates 25b.

After passing through the second polarizing plates 25b, optical images formed on the liquid crystal light bulbs 26 are combined into a single optical image at the dichroic prism 27. The thus produced optical image is projected onto the screen 29 in an increased size through the projection lens 28.

Each of the liquid crystal light bulbs 26 is comprised of a liquid crystal display panel and a frame supporting the liquid crystal display panel therewith. The liquid crystal display panel is supported by the frame by being sandwiched between the frame, and is fixed to a body of the liquid crystal display unit through the frame.

In the above-mentioned projection type liquid crystal display unit, a light leaving a liquid crystal light bulb sometimes returns back to the liquid crystal light bulb because of reflection, refraction, scattering, diffraction, divergence, deviation in an optical axis and/or aberration in the parts constituting the liquid crystal display unit, before the light is projected onto a screen as an image.

If such a light once having left a liquid crystal light bulb and returned back thereto were reflected or scattered at a surface of a frame of a liquid crystal light bulb, the light would stray into an optical path having another optical data, resulting in degradation in display quality, such as reduction in contrast of a projected image, a double image or ghost, and/or local non-uniformity in brightness.

In order to avoid the above-mentioned problem, a frame of a liquid crystal light bulb is usually composed of metal to which a special coating is applied.

FIGS. 1A and 1B illustrate cases in which a light is reflected to a frame of a liquid crystal light bulb from other parts constituting the liquid crystal display unit.

A body of a projection type liquid crystal display unit is usually coated at an inner wall thereof with black painting, and an optical part is usually coated at a surface thereof with a film which prevents light reflection.

However, as illustrated in FIG. 1A, a light may be reflected many time between a an all-reflection mirror 51 and a converging lens 52, and reach a frame of a liquid crystal light bulb 53. Then, the light is reflected at the frame and subsequently a projection lens 56, and enters a dichroic prism 55. Thus, the light strays into another image data.

As an alternative, as illustrated in FIG. 1B, a light may be wrongly reflected at a dichroic prism 55, and resultingly, reaches a frame of a liquid crystal light bulb 53, if lights emitted from a light source are not parallel with one another, and/or an optical axis is deviated because of non-uniformity in a gap in a liquid crystal panel.

In addition, a lamp used in a projection type liquid crystal display unit, such as a halogen lamp, a xenon lamp, a metal halide lamp or a high-pressure mercury lamp, and/or light absorption in parts having a small light-reflection rate generate heat in a body of a liquid crystal display unit, and resultingly, the body is kept at a high temperature inside. This causes convection current in the body. As a result, a light is scattered and/or reflected by dusts, and then, reaches a frame. The light is further scattered and/or reflected at the frame, resulting in that the light may enter another image data.

As mentioned above, reflection and/or scattering of a light cause degradation and non-uniformity in projected images.

As mentioned earlier, a liquid crystal light bulb in a projection type liquid crystal display unit is comprised of a liquid crystal display panel and a frame. A module structure of a liquid crystal display unit is grouped into two groups in dependence on whether positioning between a frame and a liquid crystal display panel is performed based on either a thin film transistor (TFT) substrate or an opposing substrate of the liquid crystal display panel. This is because that a thin film transistor substrate is usually arranged at a side at which a light leaves, in order to avoid the heat problem. Herein, the positioning between a frame and a liquid crystal display panel indicates positioning between a reference position defined at a frame or a body of a liquid crystal display unit and a display area or a center of a display area of a liquid crystal display panel.

FIG. 10 is an exploded perspective view of a liquid crystal light bulb.

Hereinbelow is explained how a liquid crystal display panel and a frame are positioned to each other, based on a thin film transistor substrate of the liquid crystal display panel, with reference to FIG. 10.

First, as illustrated in FIG. 10(a), a liquid crystal display panel 61 is positioned relative to a first frame 62. A flexible printing substrate 65 is connected to the liquid crystal display panel 61 for connecting the liquid crystal display panel 61 to an external circuit (not illustrated).

Then, as illustrated in FIG. 10(b), the liquid crystal display panel 61 is adhered to the first frame 62 through an adhesive.

Then, as illustrated in FIG. 10(c), a second frame 63 through which an incident light first passes is fixed to the first frame 62 such that the liquid crystal display panel 61 is sandwiched between the first and second frames 62 and 63.

If the first frame 62 were composed of molded resin, the first frame 62 would have a surface to which a light is much reflected. Hence, as illustrated in FIG. 10(d), a metal frame 64 is further fixed to the first frame 62. In addition, the metal frame 64 is necessary to be coated at a surface thereof with a coating for preventing light reflection.

Though the first frame 62 may be formed as a metal frame coated at a surface thereof with a coating for light reflection, it would be quite difficult to manufacture the metal frame with sufficient dimensional accuracy, and to position and fix the metal frame to the liquid crystal display panel 61.

The second frame 63 may be composed of molded resin or metal.

FIG. 11 is an exploded perspective view of a liquid crystal light bulb, similarly to FIG. 10.

Hereinbelow is explained how a liquid crystal display panel and a frame are positioned to each other, based on an opposing substrate of the liquid crystal display panel, with reference to FIG. 11.

First, a first frame 72 through which an incident light first passes is fixed to a liquid crystal display panel 71. A flexible printing substrate 74 is connected to the liquid crystal display panel 71 for connecting the liquid crystal display panel 71 to an external circuit (not illustrated).

Then, a second frame 73 is fixed to the first frame 72 such that the liquid crystal display panel 71 is sandwiched between the first and second frames 72 and 73.

The second frame 73 may be formed of a metal frame coated at a surface thereof with a coating for light reflection. However, in order to position the liquid crystal display panel relative to the first and second frames 72 and 73, based on an opposing substrate of the liquid crystal display panel 71, the opposing substrate would be required to have high accuracy in an outer shape which is not usually required to have.

The first frame 72 may be composed of molded resin or metal, but is usually composed of molded resin.

When the metal frame 64 is fixed to the first and second frames 62 and 63 both composed of molded resin, there would be caused a problem of an increased burden in designing a liquid crystal light bulb, due to a difference in a coefficient of linear expansion between the metal frame 64 and the first and second frames 62 and 63.

In addition, there are further caused problems of an increase in both the number of parts and fabrication costs.

Though the above-mentioned problems are explained as problems in a light-transmission type liquid crystal display unit, the same problems are also caused in a light-reflection type liquid crystal display unit.

Japanese Unexamined Patent Publication No. 4-104244 has suggested a projection type liquid crystal display unit. The liquid crystal display unit includes three liquid crystal display panels each of which is illuminated by red, green and blue lights, and synthesizes images formed on the three liquid crystal display panels, to project the synthesized images onto a screen. The liquid crystal display unit further includes a polarizing device to which an optical device on which an anti-reflective film is coated is coupled. The polarizing device is adhered to each of panel substrates positioned at opposite sides of the three liquid crystal display panels.

Japanese Unexamined Patent Publication No. 7-64070 has suggested a liquid crystal display device including a first electrode substrate having pixel electrodes arranged in a matrix and coplanar thin film transistors associated with the pixel electrodes, a second electrode substrate including an opposing electrode, and a liquid crystal layer sealed between the first and second electrode substrates. The liquid crystal display further includes a polarizing plate adhered to the first electrode substrate, and an anti-reflective layer formed on a surface of the polarizing plate at which an incident light leaves outwardly.

Japanese Unexamined Patent Publication No. 8-76081 has suggested a projection type liquid crystal display unit including a liquid crystal panel having an active matrix substrate on which semiconductor active devices are formed, an opposing substrate on which an opposing electrode is formed, and a liquid crystal layer sandwiched between the active matrix substrate and the opposing substrate. In operation, an image formed on the liquid crystal panel is projected onto a screen through a projection lens by illuminating the liquid crystal panel from the opposing substrate. The liquid crystal panel is designed to have a light-impermeable pattern for covering the semiconductor active device therewith in order to prevent an incident light from reaching directly to the semiconductor active device. A planar polarizing device is adhered to a surface of the active matrix substrate at which an incident light leaves, and is designed to have an anti-reflection layer at a surface at which a light leaves.

Japanese Unexamined Patent Publication No. 11-149071 has suggested a liquid crystal display device including a liquid crystal cell having two substrates and a liquid crystal layer sandwiched between the substrates, and a plate located in the vicinity of or making contact with the liquid crystal cell. The plate has a photoelastic coefficient having a characteristic relative to a temperature which characteristic is just inverse to the same of a photoelastic coefficient of the substrates. The plate compensates for non-uniformity in contrast.

However, the above-mentioned problems remain unsolved even in the above-mentioned Publications.

SUMMARY OF THE INVENTION

In view of the above-mentioned problems in the conventional liquid crystal display units, it is an object of the present invention to provide a projection type liquid crystal display unit which is capable of preventing light reflection without an increased burden in designing a liquid crystal display unit and further without an increase in both the number of parts and fabrication costs.

In one aspect of the present invention, there is provided a projection type liquid crystal display unit including (a) a liquid crystal display panel, and (b) a frame which supports the liquid crystal display panel therewith, the frame being composed of resin and having a first surface formed with an opening, an incident light passing through the liquid crystal display panel and then the opening, the first surface being roughened.

It is preferable that the frame is manufactured by means of a mold having a roughened inner surface such that the first surface is roughened in accordance with the roughened inner surface.

For instance, the frame may be composed of polyphenylene sulfide (PPS), polycarbonate (PC), liquid crystal polymer (LCP), polybutylene terephthalate (PBT), polyether ether ketone (PEEK), or polyether nytril (PEN).

For instance, the first surface may be roughened by sand blasting, plasma etching, etching through the use of chemicals, corona discharging or radiation of ultra violet having a short wavelength.

It is preferable that an interval between a recess and a projection in the roughened first surface is equal to or smaller than 100 μm in average.

There is further provided a projection type liquid crystal display unit including (a) a liquid crystal display panel, and (b) a frame which supports the liquid crystal display panel therewith, the frame being composed of resin and having a first surface formed with an opening through which the liquid crystal display panel is exposed, an incident light being reflected at the liquid crystal display panel being exposed through the opening, the first surface being roughened.

There is still further provided a projection type liquid crystal display unit including (a) a light source, (b) a liquid crystal light bulb which optically modulates a light emitted from the light source, in accordance with an image signal, and (c) a screen onto which a light having been modulated by and emitted from the liquid crystal light bulb is projected, the liquid crystal light bulb including (b1) a liquid crystal display panel, and (b2) a frame which supports the liquid crystal display panel therewith, the frame being composed of resin and having a first surface formed with an opening, an incident light passing through the liquid crystal display panel and then the opening, the first surface being roughened.

There is yet further provided a projection type liquid crystal display unit including (a) a light source, (b) a liquid crystal light bulb which optically modulates a light emitted from the light source, in accordance with an image signal, and (c) a screen onto which a light having been modulated by and emitted from the liquid crystal light bulb is projected, the liquid crystal light bulb including (b1) a liquid crystal display panel, and (b2) a frame which supports the liquid crystal display panel therewith, the frame being composed of resin and having a first surface formed with an opening through which the liquid crystal display panel is exposed, an incident light being reflected at the liquid crystal display panel being exposed through the opening, the first surface being roughened.

There is still yet further provided a projection type liquid crystal display unit including (a) a light source, (b) a converging lens which converges lights emitted from the light source, (c) a first polarizing plate which converts a light having passed the converging lens, into a linearly polarized light, (d) a liquid crystal light bulb which optically modulates the linearly polarized light in accordance with an image signal, (e) a second polarizing plate which extracts a light having an intensity varied in accordance with the image signal, out of the linearly polarized light leaving the liquid crystal light bulb, (f) a projection lens, and (g) a screen onto which the light leaving the second polarizing plate is projected through the projection lens, the liquid crystal light bulb including (d1) a liquid crystal display panel, and (d2) a frame which supports the liquid crystal display panel therewith, the frame being composed of resin and having a first surface formed with an opening, an incident light passing through the liquid crystal display panel and then the opening, the first surface being roughened.

There is further provided a projection type liquid crystal display unit including (a) a light source, (b) a polarized beam splitter which separates S-polarized light out of a light emitted from the light source, (c) a liquid crystal light bulb which receives the S-polarized light and converts the thus received S-polarized light into a modulated light having polarization varying in accordance with an image signal, the modulated light being introduced again into the polarized beam splitter to extract a light having an intensity varying in accordance with an image signal, out of the modulated light, (d) a projection lens, and (e) a screen onto which the light leaving the polarized beam splitter is projected through the projection lens, the liquid crystal light bulb including (c1) a liquid crystal display panel, and (c2) a frame which supports the liquid crystal display panel therewith, the frame being composed of resin and having a first surface formed with an opening through which the liquid crystal display panel is exposed, an incident light being reflected at the liquid crystal display panel being exposed through the opening, the first surface being roughened.

There is further provided a projection type liquid crystal display unit including (a) a first frame having a first surface formed with a first opening, (b) a second frame having a second surface formed with a second opening, and (c) a liquid crystal display panel sandwiched between the first and second frames such that an incident light passes through the second opening, the liquid crystal display panel and the first opening in this order, the first and second frames both being composed of resin, the first surface being roughened.

It is preferable that the first and second frames are composed of the same resin.

In another aspect of the present invention, there is provided a frame used for supporting a liquid crystal display panel therewith in a projection type liquid crystal display unit, the frame being composed of resin and having a first surface formed with an opening, an incident light passing through the liquid crystal display panel and then the opening, the first surface being roughened.

It is preferable that the frame is manufactured by means of a mold having a roughened inner surface such that the first surface is roughened in accordance with the roughened inner surface.

For instance, the frame is composed of polyphenylene sulfide (PPS), polycarbonate (PC), liquid crystal polymer (LCP), polybutylene terephthalate (PBT), polyether ether ketone (PEEK), or polyether nytril (PEN).

For instance, the first surface is roughened by sand blasting, plasma etching, etching through the use of chemicals, corona discharging or radiation of ultra violet having a short wavelength.

There is further provided a frame used for supporting a liquid crystal display panel therewith in a projection type liquid crystal display unit, the frame being composed of resin and having a first surface formed with an opening through which the liquid crystal display panel is exposed, an incident light being reflected at the liquid crystal display panel being exposed through the opening, the first surface being roughened.

There is still further provided a frame used for supporting a liquid crystal display panel therewith in a projection type liquid crystal display unit, the frame being comprised of a first frame having a first surface formed with a first opening, and a second frame having a second surface formed with a second opening, the liquid crystal display panel being sandwiched between the first and second frames such that an incident light passes through the second opening, the liquid crystal display panel and the first opening in this order, the first and second frames both being composed of resin, the first surface being roughened.

The advantages obtained by the aforementioned present invention will be described hereinbelow.

The present invention accomplishes a low-reflective characteristic which could not be conventionally accomplished in a frame composed of molded resin. In addition, the present invention makes it no longer necessary to use a metal frame to which a coating for preventing light reflection is applied, which was indispensable in a conventional liquid crystal display unit. This ensures reduction in fabrication costs.

Furthermore, since a metal frame is not used in the liquid crystal display unit in accordance with the present invention, the liquid crystal display unit ensures increased designability and high dimensional accuracy.

In addition, since the frames can be composed of the same resin, it would be possible to reduce a burden caused by a difference in a linear expansion coefficient among the frames, in designing a liquid crystal display unit.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1A:
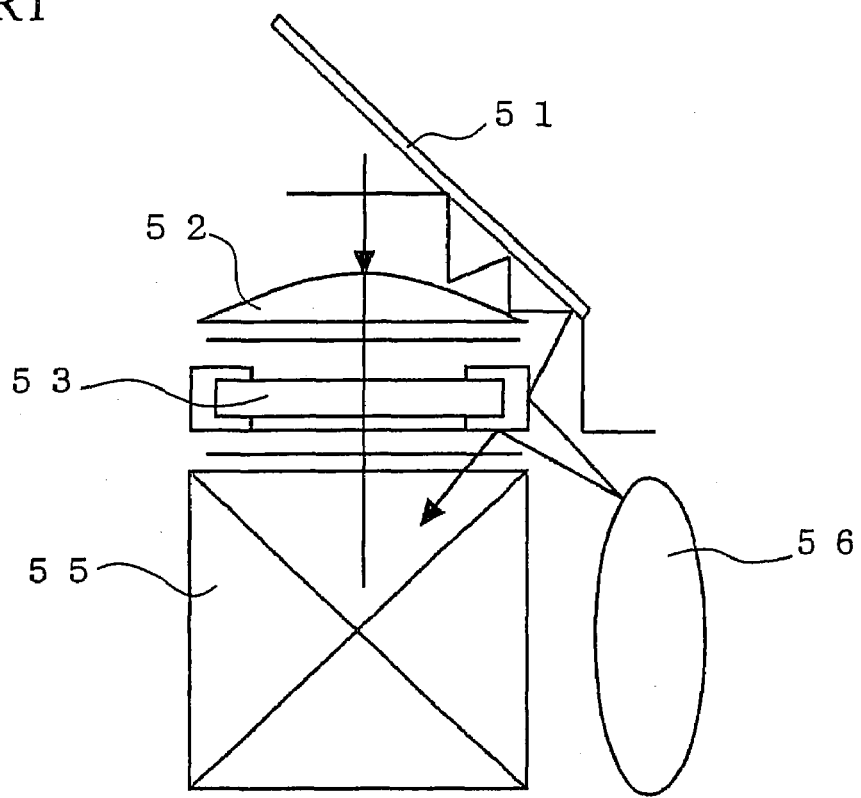
FIGS. 1A and 1B illustrate cases in which a light is reflected to a frame of a liquid crystal light bulb from other parts constituting the liquid crystal display unit.
Figure 1B:
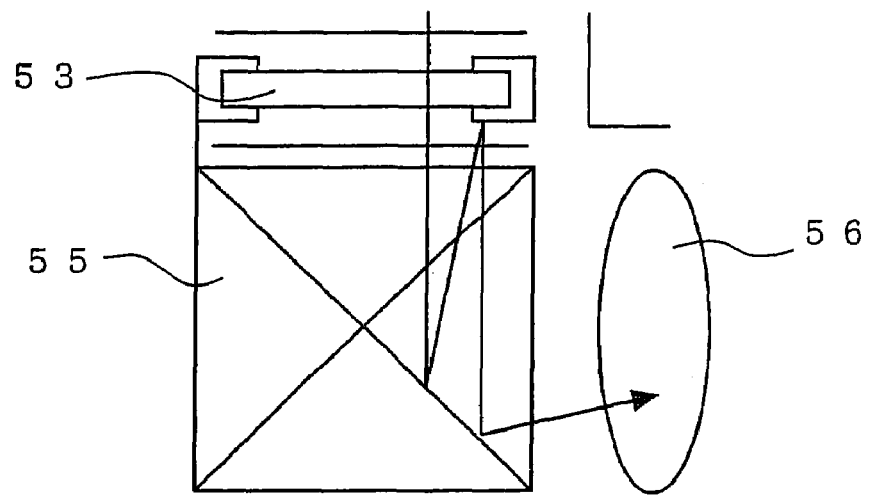
Figure 2:
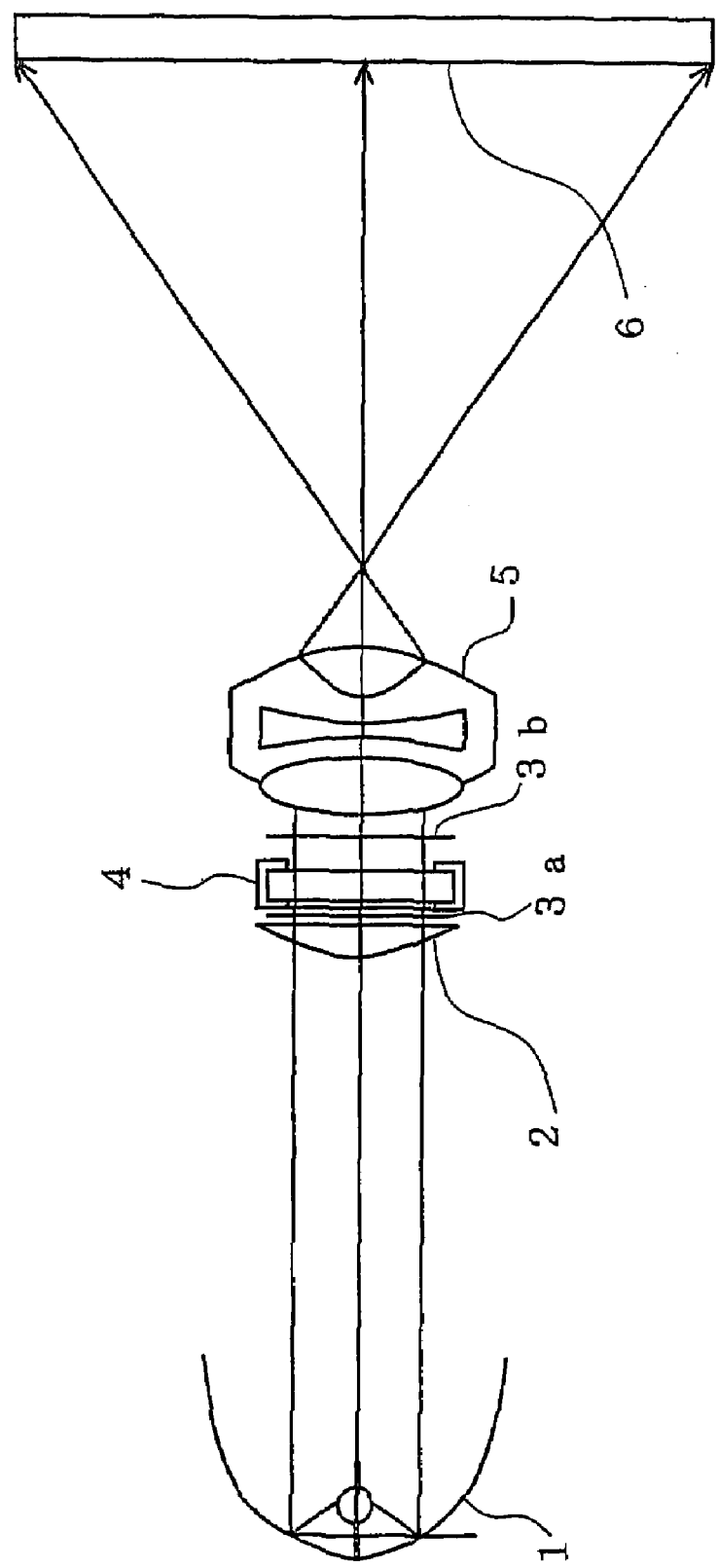
FIG. 2 illustrates a structure of a liquid crystal display unit in accordance with the first embodiment.

FIG. 2 illustrates a light-transmission and single plate type liquid crystal display unit in accordance with the first embodiment.

The liquid crystal display unit in accordance with the first embodiment is comprised of a light source 1, a converging lens 2, a first polarizing plate 3a, a liquid crystal light bulb 4, a second polarizing plate 3b, a projection lens 5, and a screen 6.

In operation, a natural light emitted from the light source 1 passes through the converging lens 2, and is converted into a linearly polarized light by the first polarizing plate 3a. The thus converted linearly polarized light enters the liquid crystal light bulb 4, and is modulated in the liquid crystal light bulb 4 as variation in polarization in accordance with an image signal. The light leaving the liquid crystal light bulb 4 passes through the second polarizing plate 3b, and is projected onto the screen in an increased size by the projection lens 5.

Figure 3:
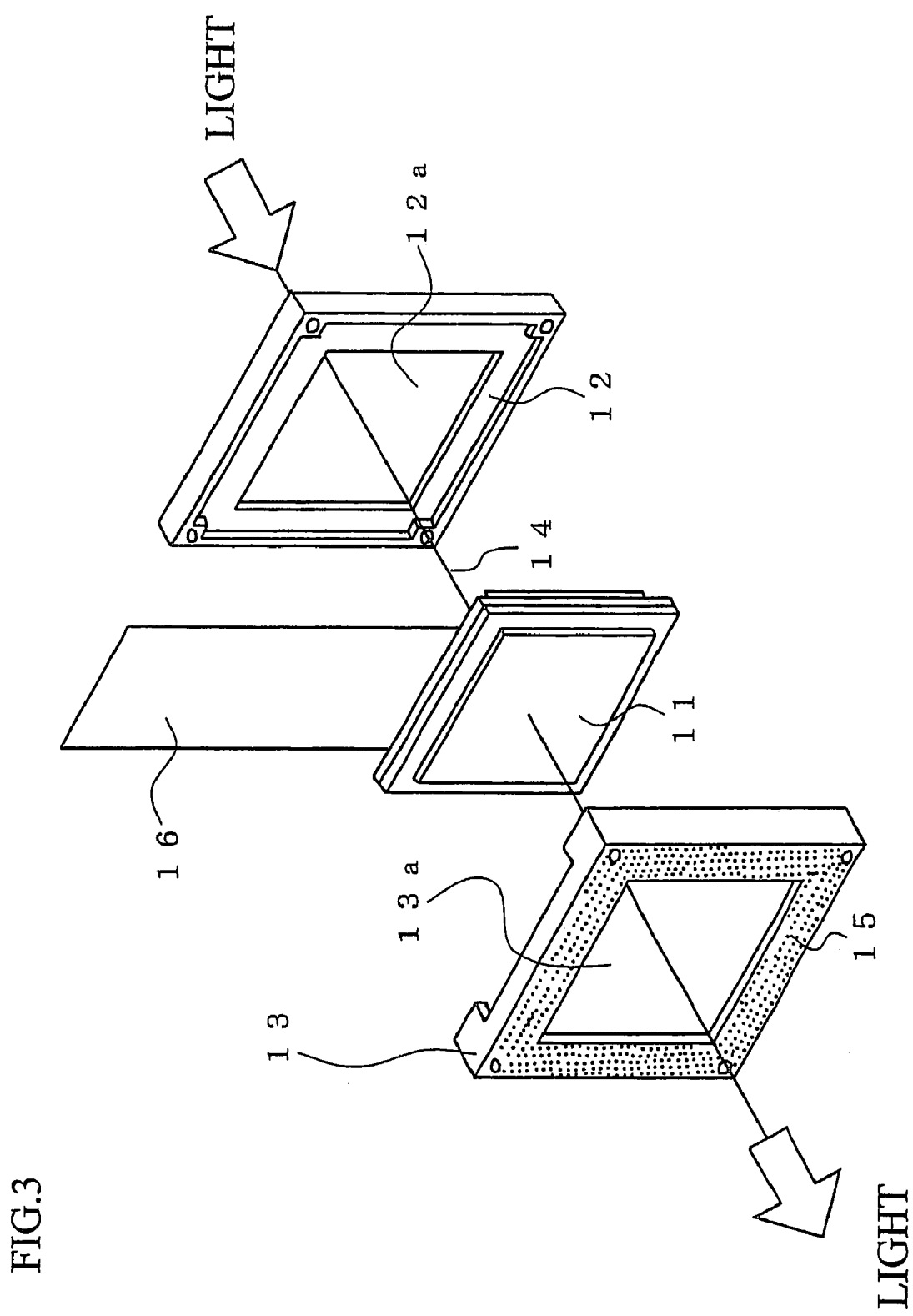
FIG. 3 is an exploded perspective view of a liquid crystal light bulb in the liquid crystal display unit in accordance with the first embodiment.

FIG. 3 illustrates a structure of the liquid crystal light bulb 4.

As illustrated in FIG. 3, the liquid crystal light bulb 4 is comprised of a liquid crystal display panel 11, a first frame 13 having a first surface 15 formed with a first opening 13a, and a second frame 12 having a second surface formed with a second opening 12a. The liquid crystal display panel 11 is sandwiched between the first and second frames 13 and 12 such that an incident light 14 passes through the second opening 12a, the liquid crystal display panel 11 and the first opening 13a in this order.

A flexible printing substrate 16 is connected to the liquid crystal display panel 11 for connecting the liquid crystal display panel 11 to an external circuit (not illustrated).

The first frame 13 is formed by molding and is composed of resin selected from polyphenylene sulfide (PPS), polycarbonate (PC), liquid crystal polymer (LCP), polybutylene terephthalate (PBT), polyether ether ketone (PEEK), or polyether nytril (PEN).

The first surface 15 of the first frame 13 which extends perpendicularly to a direction of the light 14 and at which the light 14 leaves the liquid crystal light bulb 4 is roughened by sand blasting. Herein, sand blasting indicates a method of roughened a surface by bombarding abrasive sand at a high speed to an object by virtue of a centrifugal force or compressed air. In the first embodiment, the first surface 15 is roughened by bombarding sand having a diameter of 100 μm or smaller thereto for about 60 seconds.

The first or second frame 13 or 12 may be used for positioning the liquid crystal display panel 11.

The first and second frames 13 and 12 are both composed of resin. The second frame 12 may be composed of resin different from resin of which the first frame 13 is composed. However, it is preferable that the first and second frames 13 and 12 are composed of the same or equivalent resin in order to increase designability and dimensional stability, and reduce fabrication costs.

Figure 4:
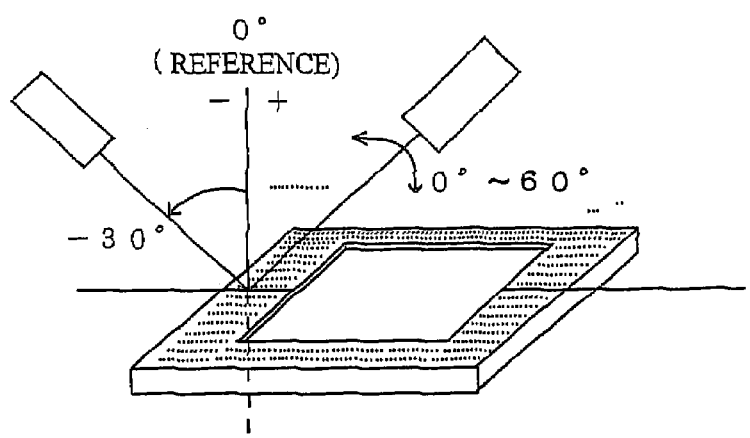
FIG. 4 illustrates a unit for measuring an intensity of reflected lights in a liquid crystal display bulb in the liquid crystal display unit in accordance with the first embodiment.

FIG. 4 illustrates a measurement unit for measuring an intensity of reflected lights in the liquid crystal display bulb 4. The experiment was conducted to measure the light-reflection characteristic of the first surface 15 through the use of the measurement unit illustrated in FIG. 4.

It is assumed that a direction perpendicular to the roughened first surface 15, that is, a forwarding direction of the light 14 indicates a reference angle or 0 degree, and that a light emitter 17 and a light receiver 18 are arranged in a plane perpendicular to the roughened first surface 15.

With the light emitter 17 being fixed at an angle of −30 degrees, the light receiver 18 is made to rotate about a vertical axis indicative of 0 degree between 0 degree to 60 degrees. With the light receiver 18 being rotated in such a way, an intensity of a light reflected at the roughened first surface 15 is measured.

The measurement was made to the first surface 15 composed of LCP resin and roughened by bombarding sand having a diameter of 100 μm or smaller thereto for about 60 seconds, a surface B composed of LCP resin, but not roughened, and a painted metal surface C.

Figure 5:
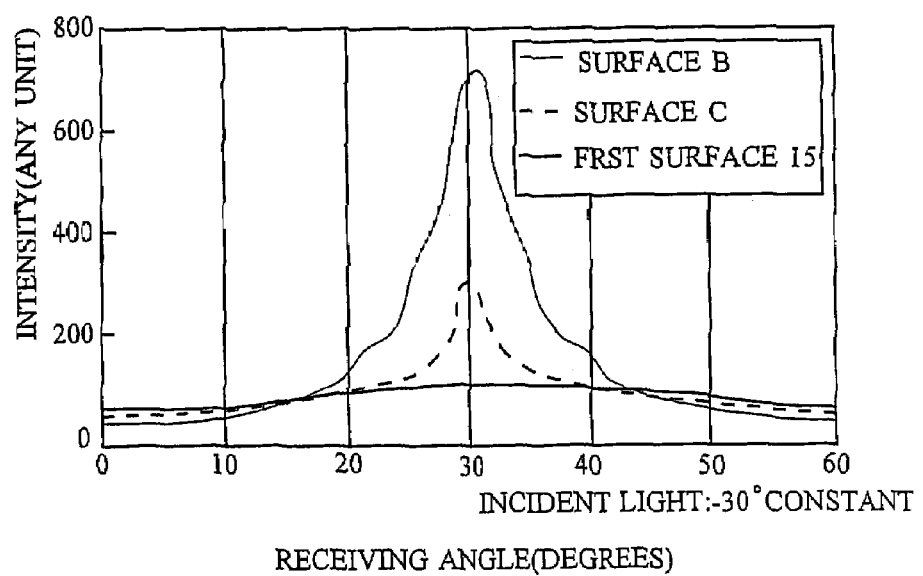
FIG. 5 is a graph showing that results of measurement of an intensity of reflected lights.

The results of the measurement are shown in FIG. 5.

The surface B exhibits the highest intensity, and the roughened first surface 15 exhibits the lowest intensity.

Though the surfaces B and C have a peak at an angle of 30 degrees, the roughened first surface 15 does not have such a peak. That is, the roughened first surface 15 shows a reflection characteristic which is flat relative to an angle at which the light receiver 18 receives the reflected light.

Herein, there is defined a flatness H as a quotient of $I_{30}$ divided by $I_0$ ($H=I_{30}/I_0$) under assumption that an intensity of a light reflected when the light receiver 18 is located at an angle of 30 degrees is indicated by $I_{30}$, and an intensity of a light reflected when the light receiver 18 is located at an angle of 0 degree and 60 degrees is indicated by $I_0$.

Calculating H in the first surface 15, the surface B and the surface C, the surface B has H of about 25, the surface C has H of about 10, and the first surface 15 has H of about 5. In practical use, if the first surface 15 is roughened by sand blasting such that H of the first surface 15 is equal to or smaller than H of the surface C, it would be possible to have sufficient display performance in the liquid crystal display bulb 4.

Though any interval between a recess and a projection in the roughened first surface 15 may be selected, it is preferable that such an interval is equal to or smaller than 100 μm in average.

The first surface 15 may be roughened by plasma etching, etching through the use of chemicals, corona discharging or radiation of ultra violet having a short wavelength as well as sand blasting.

As an alternative, the first surface 15 may be formed by means of a mold having a roughened inner surface such that the first surface 15 is roughened in accordance with the roughened inner surface. Such a roughened inner surface may be formed by crimping, sand blasting or etching.

As mentioned above, the liquid crystal display unit in accordance with the first embodiment makes it possible to prevent light reflection by roughening the first surface 15 of the first frame 13.

In addition, the liquid crystal display unit makes it no longer necessary to use a metal frame to which a coating for preventing light reflection is applied, which was indispensable in a conventional liquid crystal display unit. This ensures reduction in fabrication costs.

Furthermore, since a metal frame is no longer used in the liquid crystal display unit in accordance with the first embodiment, it is ensured that both designability and dimensional accuracy can be increased.

In addition, since the first and second frames 13 and 12 can be composed of the same resin, it would be possible to reduce a burden caused by a difference in a linear expansion coefficient among the frames, in designing a liquid crystal display unit.

Figure 6:
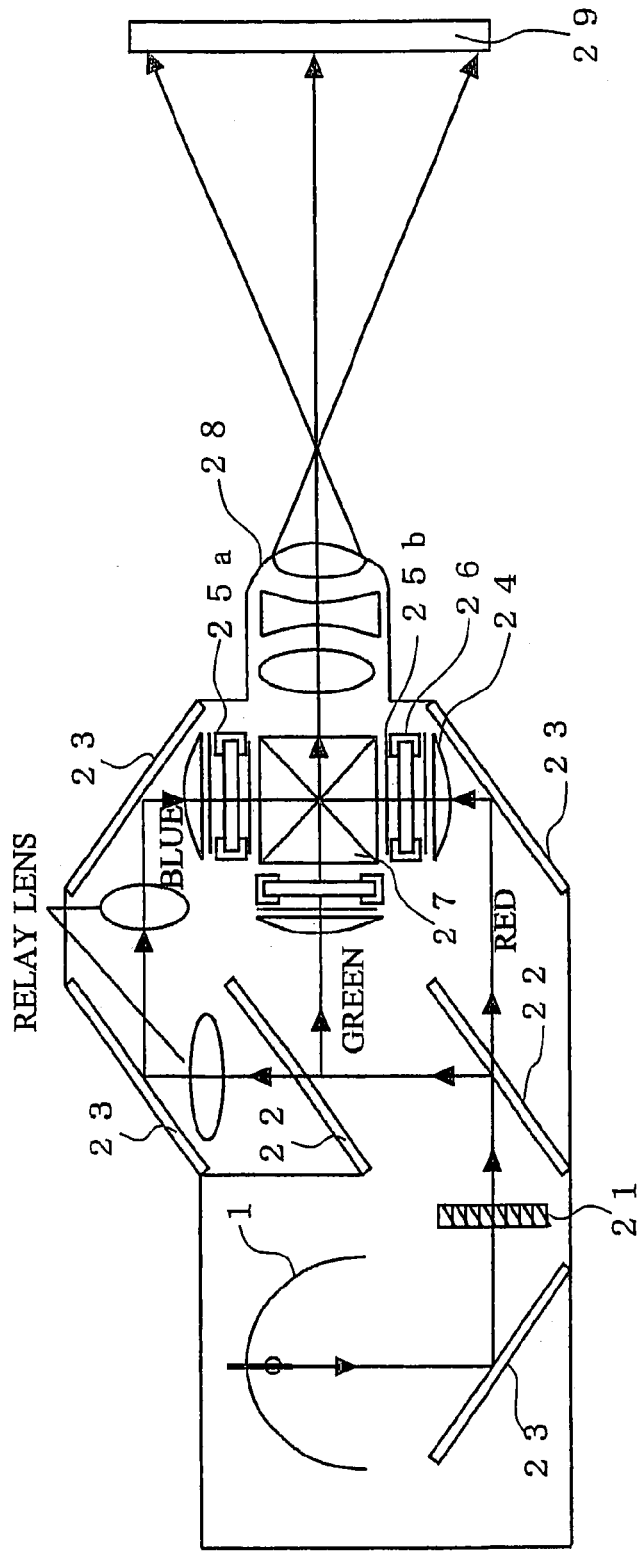
FIG. 6 illustrates a structure of a liquid crystal display unit in accordance with the second embodiment.

FIG. 6 illustrates a projection type liquid crystal display unit in accordance with the second embodiment. The liquid crystal display unit is of light-transmission and three-plate type.

The liquid crystal display unit is comprised of a light source 1, an optical system 21 for converting a light into a polarized light, two dichroic mirrors 22, four all-reflection mirrors 23, converging lenses 24, first polarizing plates 25a, second polarizing plates 25b, light liquid crystal bulbs 26, a dichroic prism 27, a projection lens 28, and a screen 29.

In operation, natural lights emitted from the light source 1 are converted into linearly polarized lights having the same forwarding direction and polarizing direction, by the optical system 21. The thus converted linearly polarized lights are separated into blue, green and red lights by an optical separation system comprised of the two dichroic mirrors 22 and the all-reflection mirrors 23. The blue, green and red lights pass through the associated converging lenses 24 and first polarizing plates 25a, and then, illuminate the associated liquid crystal light bulbs 26.

The linearly polarized lights entering the liquid crystal light bulbs 26 are modulated in the liquid crystal light bulbs 26 as variation in polarization in accordance with an image signal. The lights leaving the liquid crystal light bulbs 26 enter the associated second polarizing plates 25b. A portion of the lights displaying black is absorbed into the second polarizing plates 25b, whereas a portion of the lights displaying white passes through the second polarizing plates 25b.

After passing through the second polarizing plates 25b, optical images formed on the liquid crystal light bulbs 26 are combined into a single optical image at the dichroic prism 27. The thus produced optical image is projected onto the screen 29 in an increased size through the projection lens 28.

Each of the liquid crystal light bulbs 26 is designed to have the same structure as the structure of the liquid crystal light bulb illustrated in FIG. 3.

The liquid crystal display unit in accordance with the second embodiment presents the same advantages as those presented by the above-mentioned first embodiment.

Figure 7:
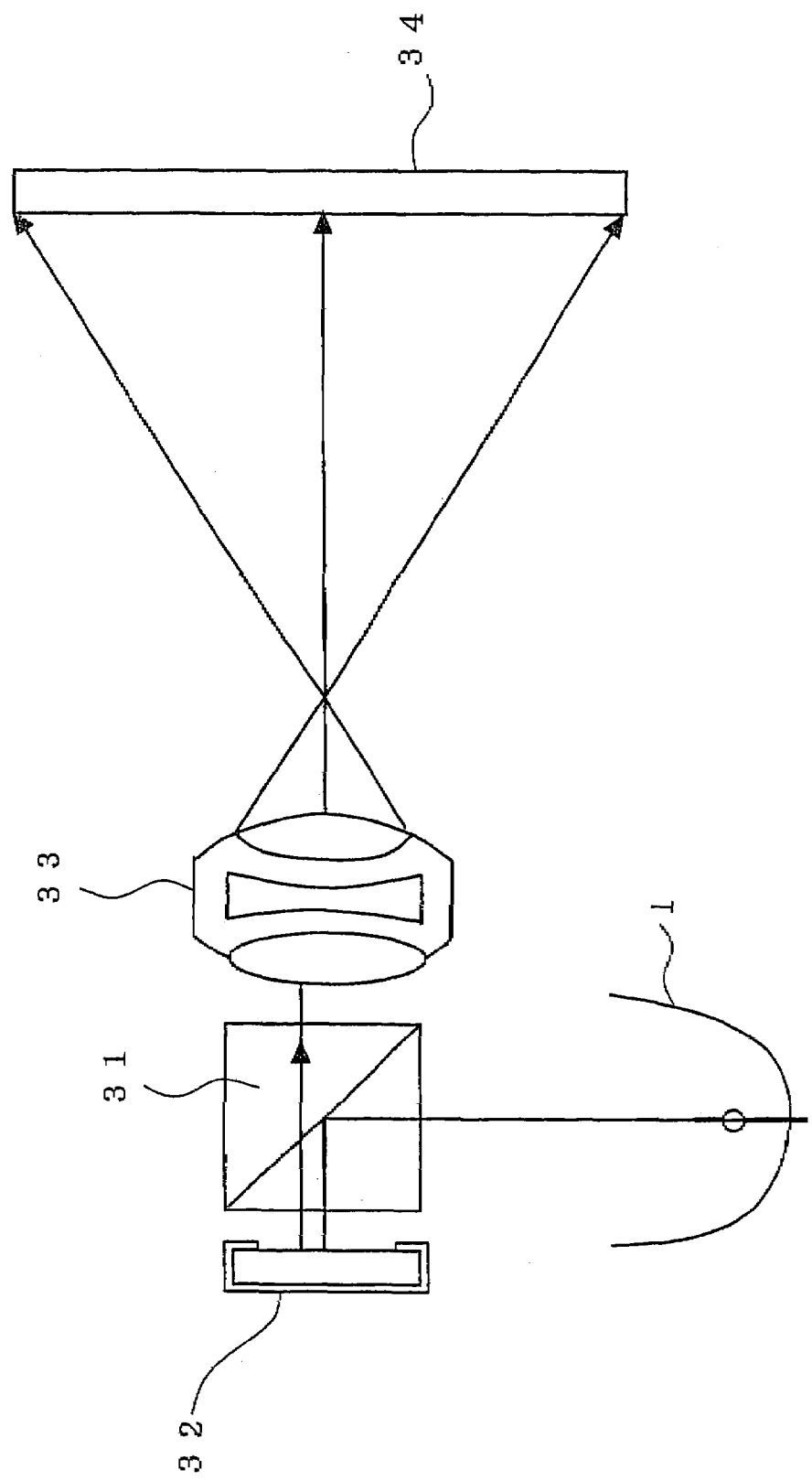
FIG. 7 illustrates a structure of a liquid crystal display unit in accordance with the third embodiment.

FIG. 7 illustrates a projection type liquid crystal display unit in accordance with the third embodiment. The liquid crystal display unit is of light-reflection and single plate type.

The liquid crystal display unit is comprised of a light source 1, a polarized beam splitter 31, a liquid crystal light bulb 32, a projection lens 33, and a screen 34.

The polarized beam splitter 31 separates only S-polarized lights out of lights emitted from the light source 1, and directs the thus separated S-polarized lights forwardly to the liquid crystal light bulb 32. A direction of polarization in the S-polarized lights is varied in the liquid crystal panels within a range of 0 to 90 degrees in accordance with an image signal. Leaving the liquid crystal light bulb 32, the S-polarized lights are transmitted through or interrupted by the polarized beam splitter 31, and then, projected onto the screen 34 in an increased size through the projection lens 33.

Figure 8:
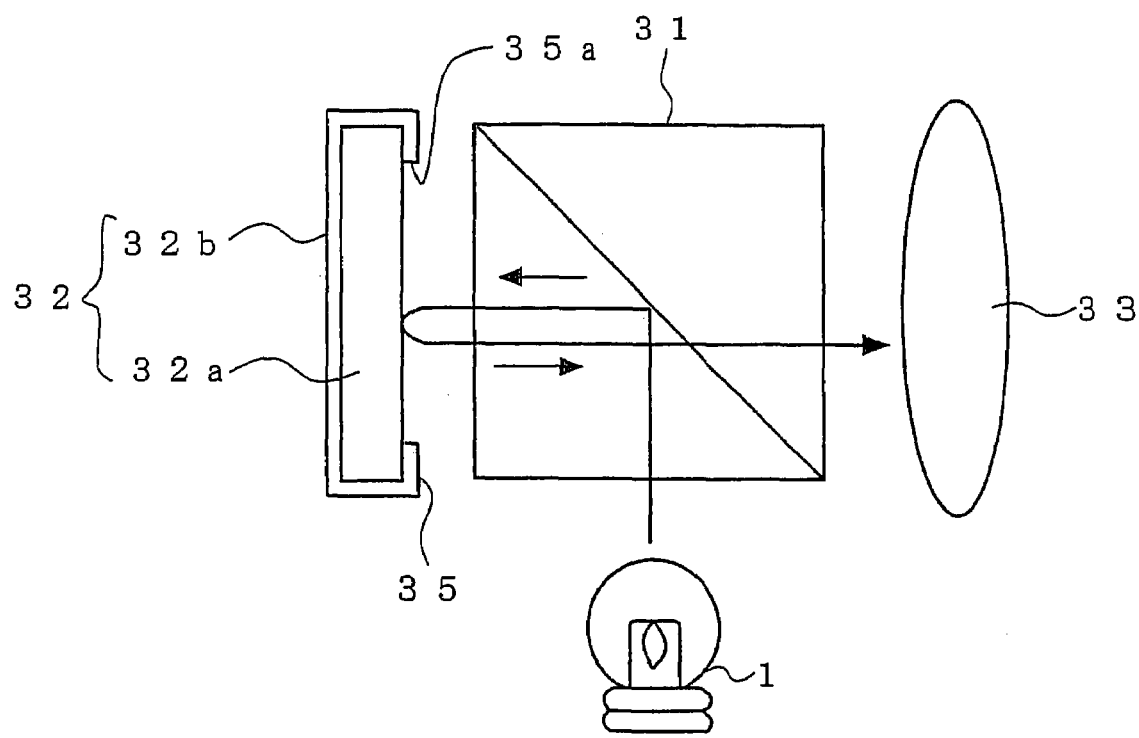
FIG. 8 is an enlarged view of a part of the liquid crystal display unit illustrated in FIG. 7.

FIG. 8 is an enlarged view of the liquid crystal light bulb 32.

As illustrated in FIG. 8, the light-reflection type liquid crystal light bulb 32 is comprised of a liquid crystal display panel 32a, and a frame 32b which supports the liquid crystal display panel 32a therewith. The frame 32b has a first surface 35 formed with an opening 35a through which the liquid crystal display panel 32a is exposed.

An incident light enters the liquid crystal display panel 32a through the opening 35a, and leaves the liquid crystal display panel 32a through the opening 35a. Hence, in the liquid crystal light bulb 32, the first surface 35 of the frame 32b is roughened by sand blasting, for instance.

By roughening the first surface 35, the liquid crystal display unit in accordance with the third embodiment presents the same advantages as those of the first embodiment.

Figure 9:
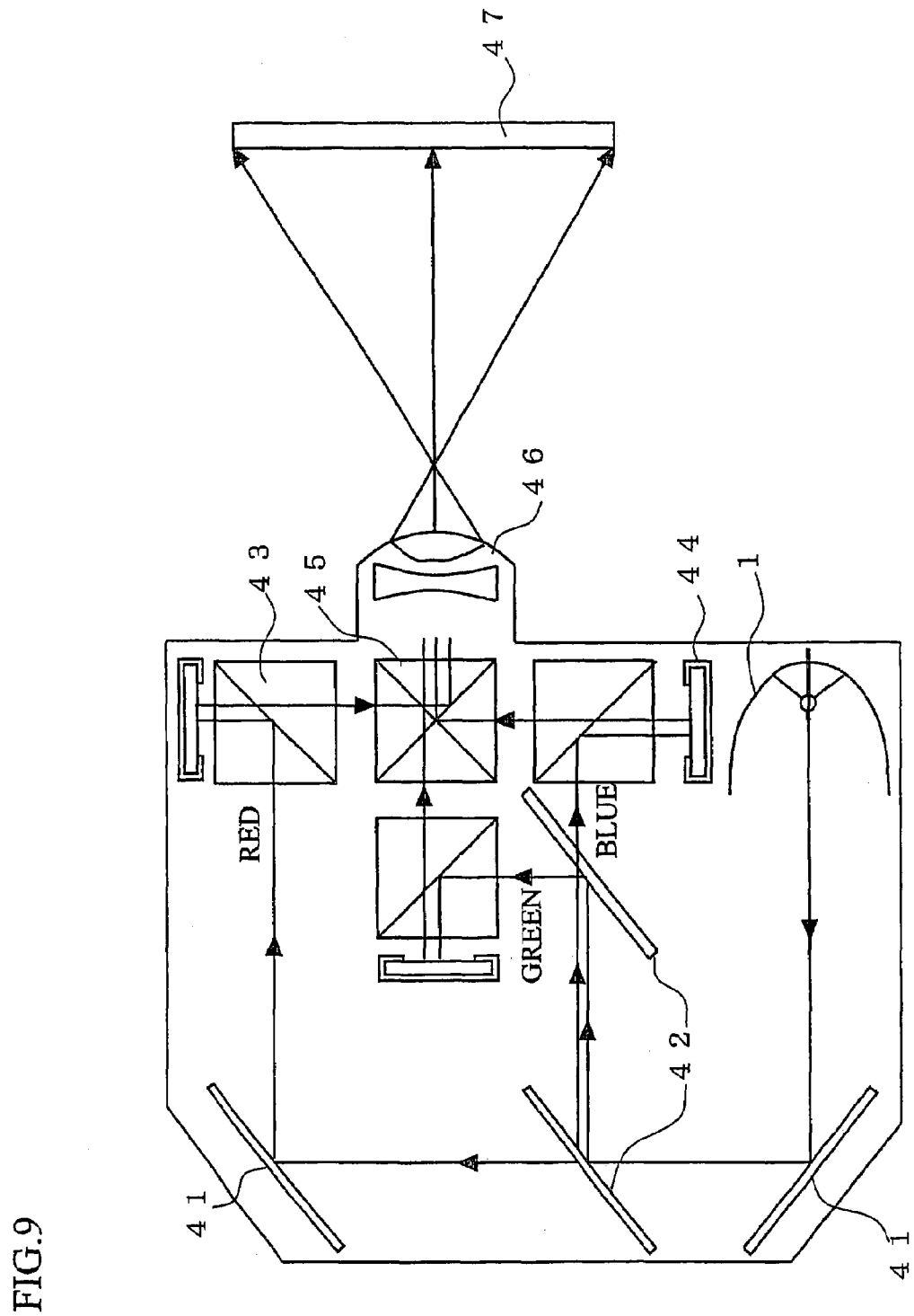
FIG. 9 illustrates a structure of a liquid crystal display unit in accordance with the fourth embodiment.
Figure 10:
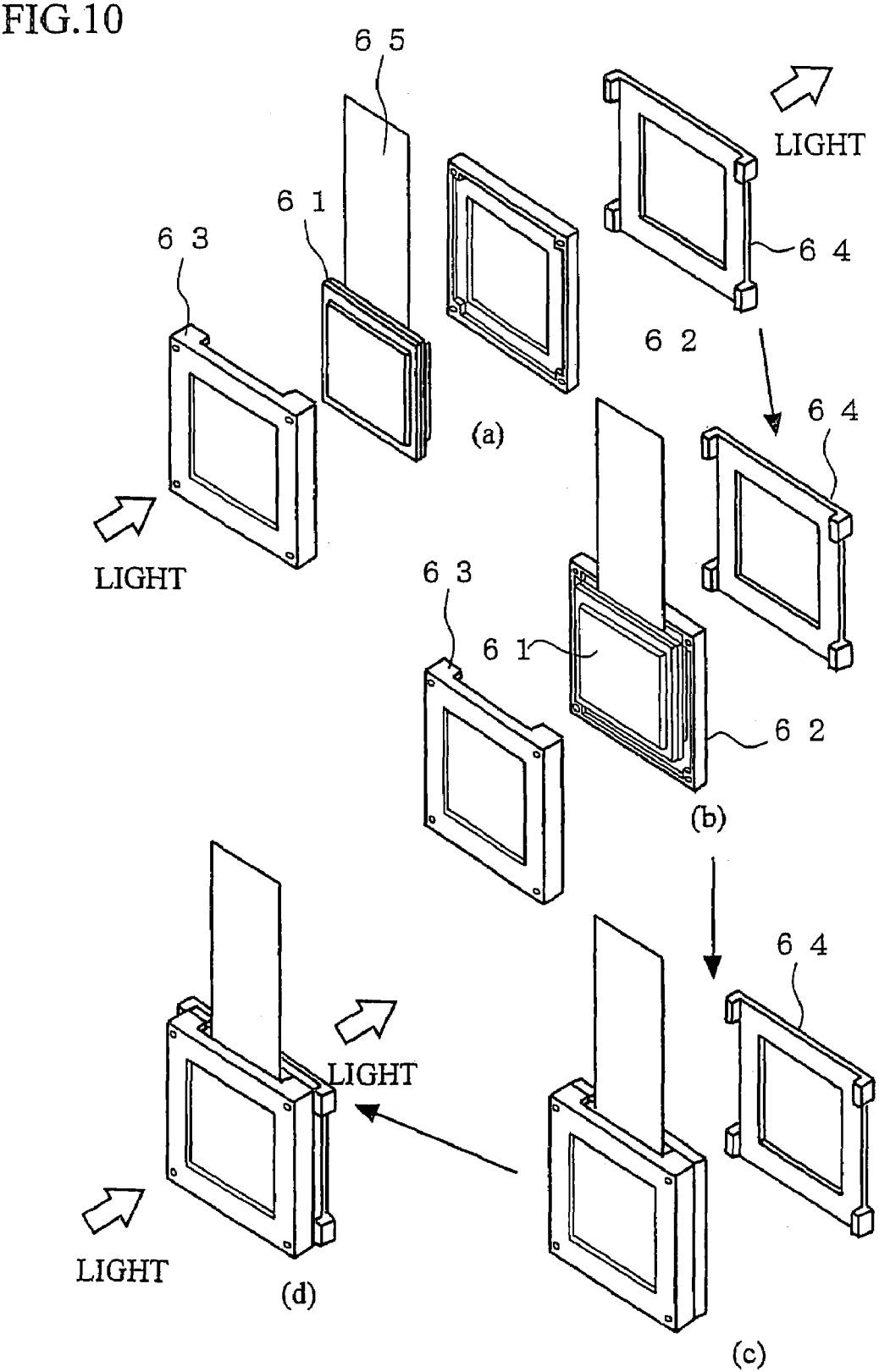
FIG. 10 is an exploded perspective view of a liquid crystal light bulb.
Figure 11:
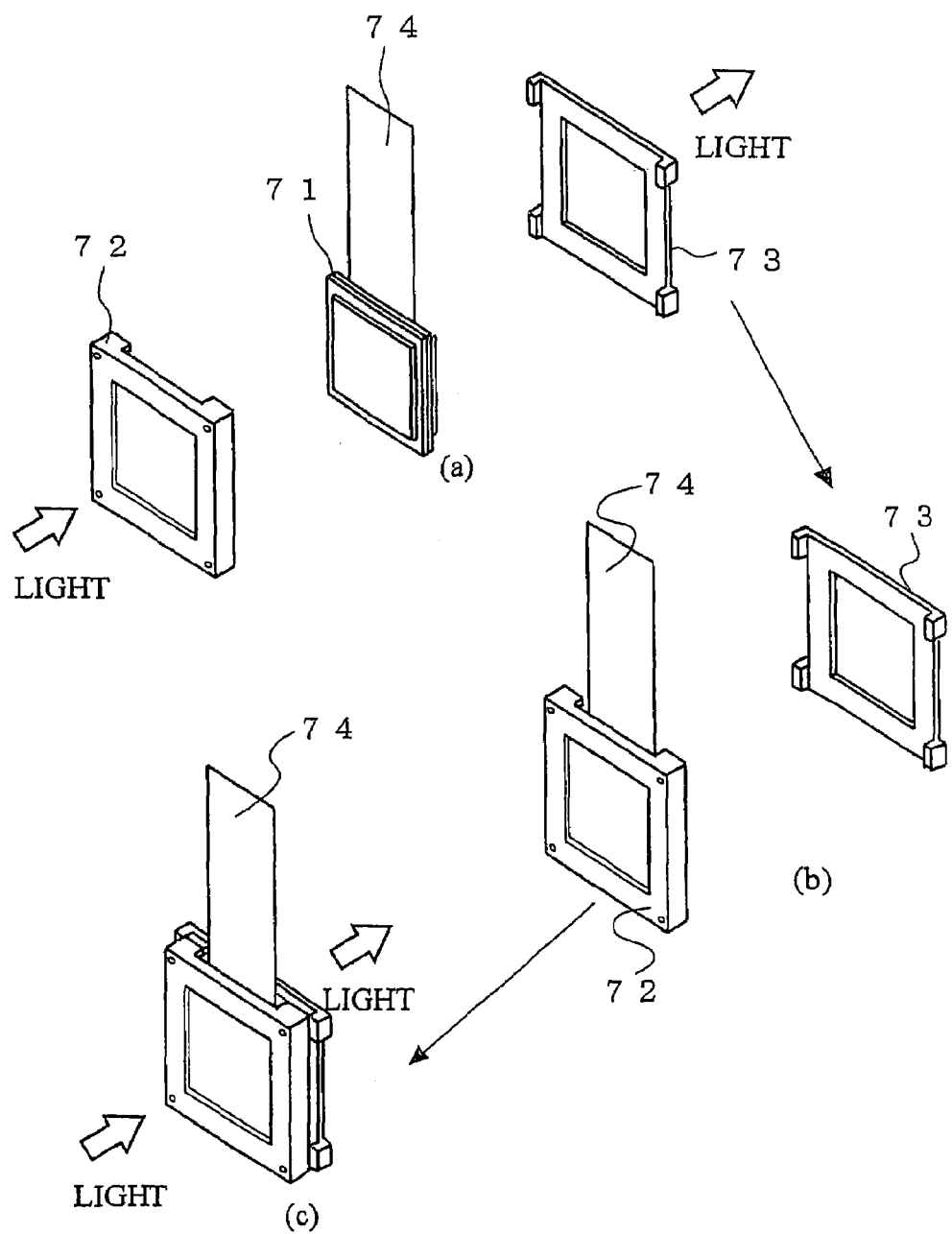
FIG. 11 is an exploded perspective view of a liquid crystal light bulb.

FIG. 9 illustrates a projection type liquid crystal display unit in accordance with the fourth embodiment. The liquid crystal display unit is of light-reflection and three-plate type.

The liquid crystal display unit is comprised of a light source 1, two all-reflection mirrors 41, two dichroic mirrors 42, three polarized beam splitters 43, three liquid crystal light bulbs 44, a dichroic prism 45, a projection lens 46, and a screen 47.

Each of the liquid crystal light bulbs 44 has the same structure as that of the liquid crystal light bulb 32 illustrated in FIG. 8.

In operation, natural lights emitted from the light source 1 are separated into blue, green and red lights by an optical separation system comprised of the all-reflection mirrors 41 and the dichroic mirrors 42. The polarized beam splitter 31 separates only S-polarized lights out of the blue, green and red lights, and directs the thus separated S-polarized lights forwardly to the liquid crystal light bulb 44. A direction of polarization in the S-polarized lights is varied in the liquid crystal panels within a range of 0 to 90 degrees in accordance with an image signal.

Leaving the liquid crystal light bulb 44, the S-polarized lights are transmitted through or interrupted by the polarized beam splitter 43, and then, synthesized into a single light by the dichroic prism 45. Then, an image formed by the light is projected onto the screen 47 in an increased size through the projection lens 46.

The liquid crystal display unit in accordance with the fourth embodiment presents the same advantages as those of the first to third embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-28394 filed on Feb. 4, 2000 including specification, claims, drawings and summary is incorporated herein by reference in its entirety.

What is claimed is:

1. A projection type liquid crystal display unit comprising:
   (a) a light source;
   (b) a polarized beam splitter which separates S-polarized light out of a light emitted from said light source;
   (c) a liquid crystal light bulb which receives said S-polarized light and converts the thus received S-polarized light into a modulated light having polarization varying in accordance with an image signal, said light source, said polarized beam splitter and said liquid crystal light bulb being aligned along a light emitting axis,
   said modulated light being introduced again into said polarized beam splitter to extract a light having an intensity varying in accordance with an image signal, out of said modulated light;
   (d) a projection lens; and
   (e) a screen onto which said light leaving said polarized beam splitter is projected through said projection lens,
   said liquid crystal light bulb including:
   (c1) a liquid crystal display panel; and
   (c2) a frame which supports said liquid crystal display panel therewith, said frame being composed of resin and having a first surface formed with an opening through which said liquid crystal display panel is exposed,
   an incident light being reflected at said liquid crystal display panel being exposed through said opening,
   said first surface being roughened.

2. The projection type liquid crystal display unit as set forth in claim 1, wherein said frame is manufactured by means of a mold having a roughened inner surface such that said first surface is roughened in accordance with said roughened inner surface.

3. The projection type liquid crystal display unit as set forth in claim 1, wherein said frame is composed of a material selected from a group consisting of polyphenylene sulfide (PPS), polycarbonate (PC), liquid crystal polymer (LCP), polybutylene terephthalate (PBT), polyether ether ketone (PEEK), and polyether nytril (PEN).

4. The projection type liquid crystal display unit as set forth in claim 1, wherein said first surface is roughened by sand blasting, plasma etching, etching through the use of chemicals, corona discharging or radiation of ultra violet having a short wavelength.

5. The projection type liquid crystal display unit as set forth in claim 1, wherein an interval between a recess and a projection in said roughened first surface is equal to or smaller than 100 μm in average.

6. A projection type liquid crystal display unit comprising:
   (a) a light source;
   (b) a polarized beam splitter which separates S-polarized light out of a light emitted from said light source;
   (c) a liquid crystal light bulb which receives said S-polarized light and converts the thus received S-polarized light into a modulated light having polarization varying in accordance with an image signal,
   said modulated light being introduced again into said polarized beam splitter to extract a light having an intensity varying in accordance with an image signal, out of said modulated light;
   (d) a projection lens; and
   (e) a screen onto which said light leaving said polarized beam splitter is projected through said projection lens,
   said polarized beam splitter including:
   (b1) a first polarizing plate upstream in a light emitting direction from said liquid crystal light bulb; and
   (b2) a second polarized plate downstream in said light emitting direction from said liquid crystal light bulb,
   said liquid crystal light bulb including:
   (c1) a liquid crystal display panel; and
   (c2) a frame which supports said liquid crystal display panel therewith, said frame being composed of resin and having a first surface formed with an opening through which said liquid crystal display panel is exposed,
   an incident light being reflected at said liquid crystal display panel being exposed through said opening,
   said first surface being roughened.

* * * * *

UNITED STATES PATENT AND TRADEMARK OFFICE
CERTIFICATE OF CORRECTION

| | | |
|---|---|---|
| PATENT NO. | : 7,602,449 B2 | |
| APPLICATION NO. | : 11/082934 | |
| DATED | : October 13, 2009 | |
| INVENTOR(S) | : Fumihiko Fujishiro | |

It is certified that error appears in the above-identified patent and that said Letters Patent is hereby corrected as shown below:

On the Title page, left column, lines 7-8, the text that reads:

Item "(73) Assignee: NEC LCD Technologies, Ltd. (Kanagawa, JP)"

should be replaced with:

--(73) Assignee: NEC Corporation, (Tokyo, JP) 50%, NEC LCD Technologies (Kanagawa, JP) 50%--

On the Title page, left column, lines 23-24, the text that reads:

"(62) Division of application No. 10/640,329, filed August 14, 2003, now Pat. No. 6,924,851"

Should be replaced with:

--(62) Division of application No. 10/640,329, filed August 14, 2003, now Pat. No. 6,924,851, which is a division of application 09/773,907, filed February 2, 2001, now Pat. No. 6,633,349--

Signed and Sealed this
Eighteenth Day of January, 2011

David J. Kappos
*Director of the United States Patent and Trademark Office*